United States Patent
Nishii et al.

(10) Patent No.: US 6,513,327 B2
(45) Date of Patent: Feb. 4, 2003

(54) HYDRAULIC PRESSURE ASSISTING DEVICE PROVIDED FOR A HYDRAULIC BRAKE APPARATUS FOR A VEHICLE

(75) Inventors: Michiharu Nishii, Toyota (JP); Satoshi Ishida, Chiryu (JP); Masaki Oishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/955,027

(22) Filed: Sep. 19, 2001

(65) Prior Publication Data

US 2002/0040580 A1 Apr. 11, 2002

(30) Foreign Application Priority Data

Sep. 19, 2000 (JP) .......................... 2000-283539

(51) Int. Cl.[7] .............................................. B60T 13/14
(52) U.S. Cl. ...................................................... 60/547.1
(58) Field of Search ............................... 60/547.1, 593, 60/533, 552

(56) References Cited

U.S. PATENT DOCUMENTS 4,435,960 A * 3/1984 Farr ........................ 60/547.1
4,548,037 A 10/1985 Farr
6,164,070 A * 12/2000 Kobayashi et al. ........ 60/547.1

FOREIGN PATENT DOCUMENTS

JP 61-57071 U 4/1986
JP 2-060871 A 3/1990

* cited by examiner

Primary Examiner—Edward K. Look
Assistant Examiner—Thomas E. Lazo
(74) Attorney, Agent, or Firm—Burns, Doane, Swecker & Mathis, LLP

(57) ABSTRACT

A hydraulic pressure assisting device includes a power piston slidably accommodated in a housing, an input member movable relative to the power piston in response to operation of a brake member, and an auxiliary hydraulic pressure source that increases brake fluid in a reservoir to a predetermined pressure and outputs power hydraulic pressure. A pressure modulator connected to the auxiliary hydraulic pressure source and the reservoir modulates power hydraulic pressure outputted from the auxiliary hydraulic pressure source to a predetermined pressure corresponding to movement of the input member relative to the power piston and supplies modulated power hydraulic pressure to a power chamber in the power piston. A cylindrical elastic member has one end portion connected to the input member or power piston and another end portion connected to the housing, with a space being defined in the elastic member connected to the pressure modulator and the reservoir.

18 Claims, 3 Drawing Sheets

HYDRAULIC PRESSURE ASSISTING DEVICE PROVIDED FOR A HYDRAULIC BRAKE APPARATUS FOR A VEHICLE

This application is based on and claims priority under 35 U.S.C. §119 with respect to Japanese Patent Application 2000-283539 filed on Sep. 19, 2000, the entire content of which is incorporated herein by reference.

FIELD OF THE INVENTION

This invention generally relates to a vehicle hydraulic brake apparatus. More particularly, the present invention pertains to a hydraulic pressure assisting device for a vehicle hydraulic brake apparatus.

BACKGROUND OF THE INVENTION

Various types of hydraulic pressure assisting devices provided for vehicle hydraulic brake apparatus are known, including, for example, hydraulic pressure boosters. A so-called direct-acting type hydraulic pressure booster is disclosed in a Japanese Patent Application published as Toku-Kai-Hlei 2 (1990)-060871. This known hydraulic pressure booster includes an input shaft and a plug disposed along a housing. A hydraulic passage is axially defined in the input shaft. An annular groove is defined between two sealing members disposed in the plug. The booster is designed so that hydraulic fluid is ejected to a reservoir through the passage of the input shaft and the annular groove.

U.S. Pat. No, 4,548,037 discloses a hydraulic power booster constituting a hydraulic pressure assisting device. This known hydraulic power booster includes an input piston and a boost piston. A reservoir chamber is defined between a sealing member disposed in the respective input piston and the boost piston. This booster is designed so that hydraulic fluid is ejected to a reservoir from the reservoir chamber through an exhaust port.

The hydraulic pressure booster disclosed in the aforementioned Japanese Patent Application published as Toku-Kai-Hei 2 (1990)-060871 includes two sealing members disposed in the plug adjacent to the housing. For that reason, an axial distance between these two sealing members is required to have a maximum length corresponding to the slidable movement of the input shaft or input member. Further, an extending portion of the input shaft that extends outwardly from the position of one of the sealing members is required to have the maximum length of the slidable movement of the input shaft. Thus, the actual length of the input shaft may be at least twice as long as the maximum length of slidable movement thereof. As a result, the hydraulic pressure assisting device is quite long, thus providing a device having an excessively large size.

With respect to the hydraulic power booster disclosed in the aforementioned U.S. Pat. No. , 4,548,037, the reservoir chamber is mechanically expanded and reduced in response to movement of the input piston. The sealing member disposed in the input piston is slidably moved at the inner surface of the housing. Therefore, it may be necessary to manufacture the inner surface of the housing and the input piston to possess high durability characteristics, thus increasing the manufacturing cost.

As described above, it thus seems that the vehicle hydraulic brake apparatuses are susceptible of certain improvements with respect to being provided with an improved hydraulic pressure assisting device that reduces the slidable moving portion of the sealing member, reduce the length of the hydraulic pressure assisting device, and is manufactured at a low cost.

SUMMARY OF THE INVENTION

A hydraulic pressure assisting device for a hydraulic brake apparatus of a vehicle includes a power piston slidably accommodated in a housing, an input member movable relative to the power piston in response to operation of a brake operating member, an auxiliary hydraulic pressure source, a pressure modulating device, and a cylindrical elastic member. The auxiliary hydraulic pressure source increases brake fluid in a reservoir to a predetermined pressure and outputs power hydraulic pressure. The pressure modulating device is connected to the auxiliary hydraulic pressure source and the reservoir for modulating the power hydraulic pressure outputted from the auxiliary hydraulic pressure source to a predetermined pressure corresponding to movement of the input member relative to the power piston and for supplying the modulated power hydraulic pressure to a power chamber in the power piston. The cylindrical elastic member has one opening end portion connected to the input member and another opening end portion connected to the housing. A space defined in the cylindrical elastic member is connected to the pressure modulating device and the reservoir.

Alternatively, the one opening end portion of the cylindrical elastic member can be connected to the power piston while the other opening end portion is connected to the housing, with the space defined in the cylindrical elastic member once again being connected to the pressure modulating device and the reservoir.

The hydraulic pressure assisting device can also include a solid covering member that covers the cylindrical elastic member and the inner space of the solid covering member, with the solid covering member being approximately in contact with the outer surface of the cylindrical elastic member.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
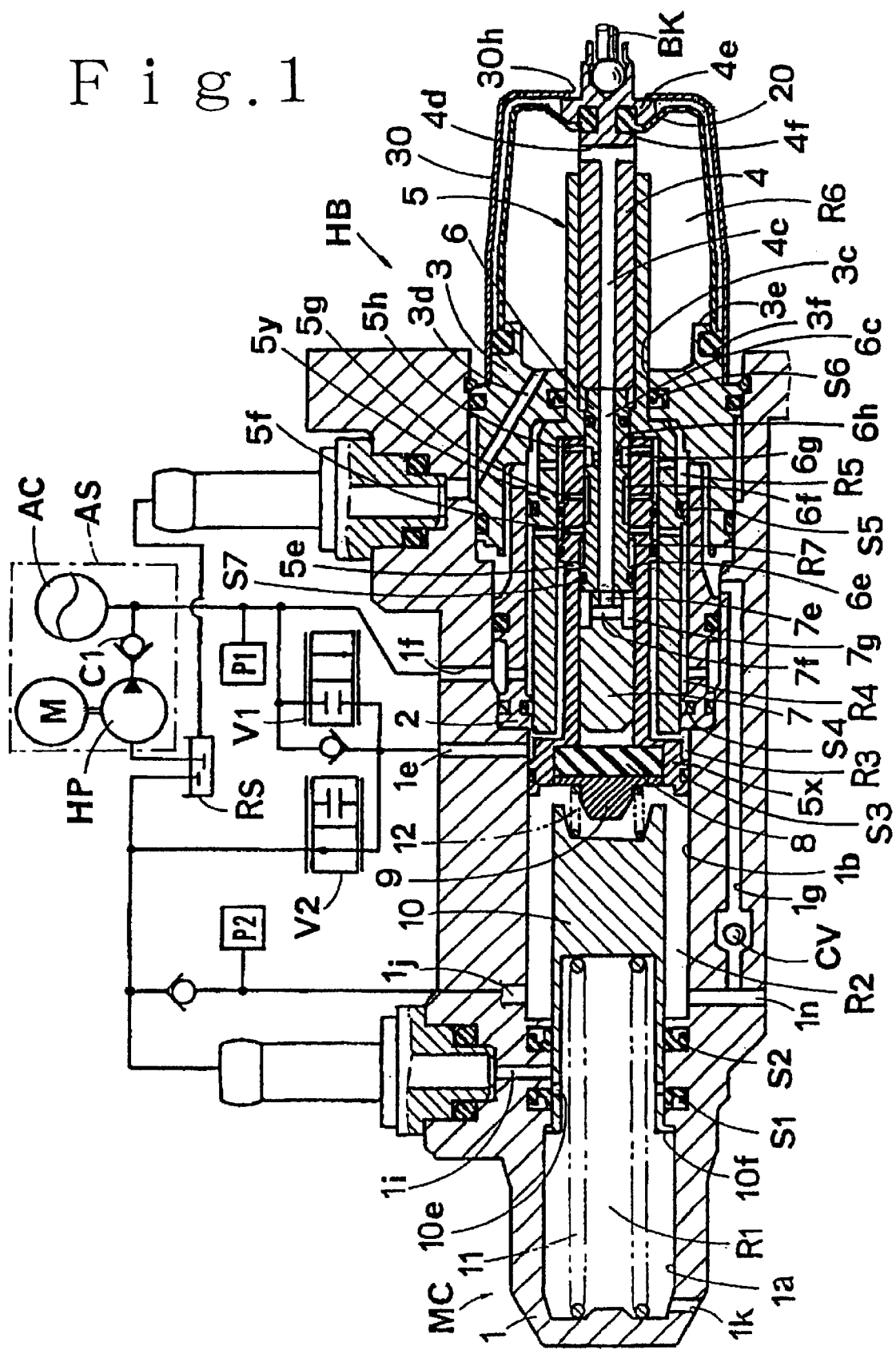
FIG. 1 is a cross-sectional view of a hydraulic brake apparatus including a hydraulic pressure assisting device according to a first embodiment of the present invention.

Referring initially to FIG. 1, which illustrates a vehicle hydraulic brake apparatus provided with a hydraulic pressure assisting device in accordance with the present invention, a depression force applied to a brake operating member (e.g., a brake pedal) is transmitted as a brake operating force to a hydraulic pressure booster HB via an input rod BK. The brake operating force is boosted by the hydraulic pressure booster HB, and then hydraulic brake pressure is outputted from a master cylinder MC. The hydraulic brake pressure is supplied to wheel brake cylinders which are each operatively mounted on one of wheels of the vehicle.

As shown in FIG. 1, a cylinder 1 is provided with a cylinder bore 1a and a stepped cylinder bore 1b. A master piston 10 and a power piston 5 are accommodated in series in the cylinder 1 and form a tandem brake master cylinder. A cylinder 2 and another cylinder 3 are accommodated in the stepped cylinder bore 1b and form a housing of the hydraulic brake apparatus in conjunction with the cylinder 1. The housing is thus comprised of the cylinder 1 forming a first cylinder, the cylinder 2 forming a second cylinder, and the cylinder 3 forming a third cylinder.

A pair of fluid supply ports 1i, 1j and a pair of fluid outlet ports 1k, in are defined in the cylinder 1. The outlet port 1k communicates with a first pressure chamber R1 and the outlet port in communicates with a second pressure chamber R2. Further, the outlet port 1k is connected to the wheel brake cylinders mounted on the respective vehicle front wheels and the outlet port in is connected to the wheel brake cylinders mounted on the respective vehicle rear wheels.

Two annular cup-like sealing members S1, S2 are disposed at a front end portion of the cylinder 1. The master piston 10 with a closed bottom portion at one end (i.e., the rear end or right side end in FIG. 1) is supported in a fluid-tight and slidable manner by the sealing members S1, S2, wherein the first pressure chamber R1 is defined in a forward direction of the master piston 10. The power piston 5 is accommodated in a rearward direction of the master piston 10 and is supported in a fluid-tight and slidable manner by an opening portion 3c defined in a rearward direction of the cylinder 3, wherein the second pressure chamber R2 is defined between the master piston 10 and the power piston 5.

A return spring 11 extends between a front end surface of the cylinder 1 and the recessed bottom surface of the master piston 10. The master piston 10 is thus biased in the rearward direction. An engaging portion 10f is formed at the front edge of the master piston 10 and is bent outwardly. The engaging portion 10f engages a stepped portion of the cylinder 1. Rearward movement of the master piston 10 is thus restricted. At the rear end position of the master piston 10 under a non-operated condition, the first pressure chamber R1 communicates with a reservoir RS via a communicating hole 10e defined in a skirt portion of the master piston 10 and the fluid supply port 1i.

As shown in FIG. 1, the power piston 5 is divided into a piston member 5x positioned in the forward direction of the power piston 5 and a piston member 5y positioned in the rearward direction of the power piston 5. A sealing member S3 is received at a land portion of the front piston member 5x and a sealing member S5 is received at a land portion of tile rear piston member 5y. A sealing member S4 is disposed in the inner surface of the cylinder 2 between at a location between these two sealing members S3, S5. An annular cup-shaped sealing member S6 is disposed in the rearward direction or rear portion of the cylinder 3.

According to the above-described construction, an annular chamber R3 is defined between the sealing members S3, S4 and an annular chamber R4 is defined between the sealing members S4, S5. A power chamber R5 is defined between the sealing members S5, S6. The piston member 5x of the power piston 5 is provided with a recessed portion in the forward direction of the piston member 5x and a stepped hollow portion behind the recessed portion. A communicating hole 5e is defined in the piston member 5x for connecting the hollow portion to the annular chamber R3. A communicating hole 5f is defined in the piston member 5x for connecting the hollow portion to the annular chamber R4. Two communicating holes 5g, 5h are also defined in the piston member 5x for connecting the hollow portion to the power chamber R5.

An input member 4 is slidably and movably disposed behind or rearwardly of the hollow portion of the piston member 5x. The input rod BK is connected to a rearward portion of the input member 4. An annular projecting portion 4e is formed at a rearward end portion of the input member 4 and an annular groove 4f is defined at the outer surface of a forward skirt portion of the projecting portion 4e. An opening end portion of a rubber boot or cylindrical elastic member 20 is received by the annular groove 4f.

An extending portion 3e is formed at the rearward end portion of the cylinder 3 and an annular groove 3f is defined at the outer surface of the extending portion 3e. The other opening end portion of the rubber boot 20 is received by the annular groove 3f. A drain chamber R6 is thus defined in the rubber boot 20. Because the hydraulic pressure booster HB is entirely blocked from the outside, dust is inhibited or prevented from entering into the hydraulic pressure booster HB. Further, the input member 4 and the power piston 5 are not exposed to atmospheric air. A communicating hole 4c is axially defined in the input member 4 while a communicating hole 4d is radially defined in the input member 4 and is connected to the communicating hole 4c. The communicating hole 4d further communicates with the drain chamber R6.

A cover 30 (i.e., a solid covering member) is fixed to the extending portion 3e of the cylinder 3 and surrounds the rubber boot 20. The inner surface of the cover 30 is approximately in contact with an outer surface of the rubber boot 20 as shown in FIG. 1. The cover 30 is a metal cylinder with a closed bottom portion at one end in which is defined a communicating hole 30h. The input member 4 extends through the communicating hole 30h, and the projecting portion 4e of the input member 4 is engaged with the closed bottom portion of the cover 30. The drain chamber R6 defined inside the rubber boot 20 normally includes a low-pressure brake fluid. However, when the drain chamber R6 is required to be filled with brake fluid for bleeding air from the drain chamber R6, the brake fluid in the drain chamber R6 comes under high pressure. Accordingly, the cover 30 serves to protect against the high-pressure in the drain chamber R6. Further, the cover 30 effectively prevents the hydraulic brake apparatus from being damaged, for example when the hydraulic brake apparatus is carried to the vehicle or is accommodated in the vehicle.

A spool 6 is disposed forwardly of the input member 4 via a sealing member S7 in a fluid-tight and slidable manner. A plunger 7 is slidably and movably disposed ahead of the spool 6. A rubber made reaction disc 8 is disposed in the recessed portion defined at the front edge of the piston member 5x. The rubber made reaction disc 8 is an elastic member for transmitting a reaction force. A pressure receiving member 9 is axially movably accommodated at a position forward of the reaction disc 8 and is firmly in contact with the reaction disc 8. A return spring 12 extends between the master piston 10 and the pressure receiving member 9 so that a direct force transmission between the master piston 10 and the pressure receiving member 9 can be carried out. Further, under the non-operated condition shown in FIG. 1, a slight clearance is defined between the rear end of the reaction disc 8 and the front edge surface of the plunger 7.

An axially extending communicating hole 6c is provided in the spool 6. The outer surface of the spool 6 is provided with a stepped portion 6e. Annular grooves 6f, 6g are defined at the outer periphery of a smaller diameter portion of the spool 6. A radially extending communicating hole 6h is also defined in the spool 6. The communicating hole 6c communicates with the annular groove 6g via the communicating hole 6h. Under the non-operated condition shown in FIG. 1, the annular grooves 6f, 6g face an opening portion of the respective communicating holes 5g, 5h, wherein the power chamber R5 communicates with the communicating hole 6c via the communicating hole 5h, the annular groove 6g, and the communicating hole 6h. Upon forward movement of the spool 6, the communication between the power chamber R5 and the communicating hole 6c is interrupted. Alternatively, the annular groove 6f faces an opening portion of the respective communicating holes 5f, 5g, wherein the power chamber R5 communicates with an inlet port 1f. A hydraulic pressure introducing chamber R7 is defined in the rearward direction of the stepped portion 6e of the spool 6. Further, a hydraulic pressure chamber is defined between the rearward edge of the spool 6 and the input member 4 via the drain chamber R6. The hydraulic pressure chamber communicates with the reservoir RS via the drain chamber R6, but is separated from the hydraulic pressure introducing chamber R7.

An annular groove 7g is defined on the outer surface of the plunger 7 in the rearward direction of the plunger. An axially extending hole 7e opens in the rearward direction of the plunger 7 and faces an opening portion of the communicating hole 6c. The hole 7e communicates with the annular groove 7g via a radially extending communicating hole 7f defined in the spool 7. A space in which is disposed the plunger 7 communicates with the reservoir RS via the communicating hole 6c of the spool 6, the communicating holes 4c, 4d of the input member 4, the drain chamber R6 and the drain port 3d.

Two inlet ports 1e, 1f are defined in the rearward direction of the cylinder 1. The drain port 3d is defined in the rearward direction of the cylinder 3 and is connected to the reservoir RS. The inlet ports 1e, 1f are connected to an auxiliary hydraulic pressure source AS. The inlet port 1e communicates with the annular chamber R3. The inlet port 1e is connected to the auxiliary hydraulic pressure source AS via a normally-open type solenoid valve V1 and is connected to the reservoir RS via a normally-closed type solenoid valve V2. In this described embodiment of the present invention, the respective solenoid valves V1, V2 are in the form of linear solenoid valves.

The auxiliary hydraulic pressure source AS is provided with an electric motor M and a hydraulic pressure pump HP driven by the motor M. An input side of the hydraulic pressure pump HP is connected to the reservoir RS and an output side of the hydraulic pressure pump HP is connected to an accumulator AC through a check valve C1. The output side of the hydraulic pressure pump HP is further connected to the inlet port if and is connected to the inlet port 1e through the solenoid valve V1 when the solenoid valve V1 is actuated. A hydraulic pressure sensor P1 is connected to the accumulator AC for monitoring the power hydraulic pressure outputted from the auxiliary hydraulic pressure source AS. Therefore, the outputted power hydraulic pressure is maintained at a predetermined hydraulic pressure level. A hydraulic pressure sensor P2 is disposed for monitoring the hydraulic pressure in the pressure chamber R2 that is actually the hydraulic brake pressure outputted from the master cylinder MC.

Further, a fluid passage 1g is defined in the cylinder 1 for hydraulically connecting the pressure chamber R2 with the power chamber R5. A normally-open type pressure differential responsive check valve CV (hereinafter, referred to as a check valve CV) is disposed in the fluid passage 1g. The check valve CV normally connects the pressure chamber R2 with the power chamber R5. The check valve CV is operated for being closed in response to the pressure differential between the power chamber R5 and the pressure chamber R2. When the hydraulic pressure in the power chamber R5 is larger than the hydraulic pressure in the pressure chamber R2 and when the pressure differential between the two chambers R5, R2 is equal to or greater than a predetermined value, the check valve CV is operated for being closed, thus interrupting communication between the power chamber R5 and the pressure chamber R2. On the other hand, when the hydraulic brake apparatus is under the non-operated condition, the check valve CV is maintained at the open position because there is no pressure applied to the power chamber R5 and the pressure chamber R2. Therefore, when the pressure chamber R2 is required to be filled with brake fluid, an evacuation of the air in the pressure chamber R2 can be carried out relatively easily and accurately by bleeding air from the power chamber R5 and feeding brake fluid from the reservoir RS via the fluid supply port 1j.

The overall operation of the hydraulic brake apparatus constructed in the above-described manner is as follows. FIG. 1 shows the position of the various components forming the hydraulic brake apparatus when the brake pedal is in the non-operated condition. Under the non-operated condition, the solenoid valve V1 is in the closed position and the solenoid valve V2 is in the open position. Further, the hydraulic pressure booster HB is in the non-operated condition. The annular chamber R4 is connected to the auxiliary hydraulic pressure source AS, while the communication between the communicating hole 5f and the power chamber R5 is blocked by the spool 6. The power chamber R5 communicates with the reservoir RS via the communicating hole 5h, the annular groove 6g, the communicating holes 6h, 6c of the spool 6, the communicating holes 4c, 4d of the input member 4, the drain chamber R6, and the drain port 3d. The power chamber R5 further communicates with the second pressure chamber R2 via the fluid passage 1g and the check valve CV. Accordingly, when the auxiliary hydraulic pressure source AS is activated, the power piston 5 is applied only with a rearward force by the hydraulic pressure in the annular chamber R4. Therefore, the power piston 5 can be maintained at the position shown in FIG. 1.

Figure 2:
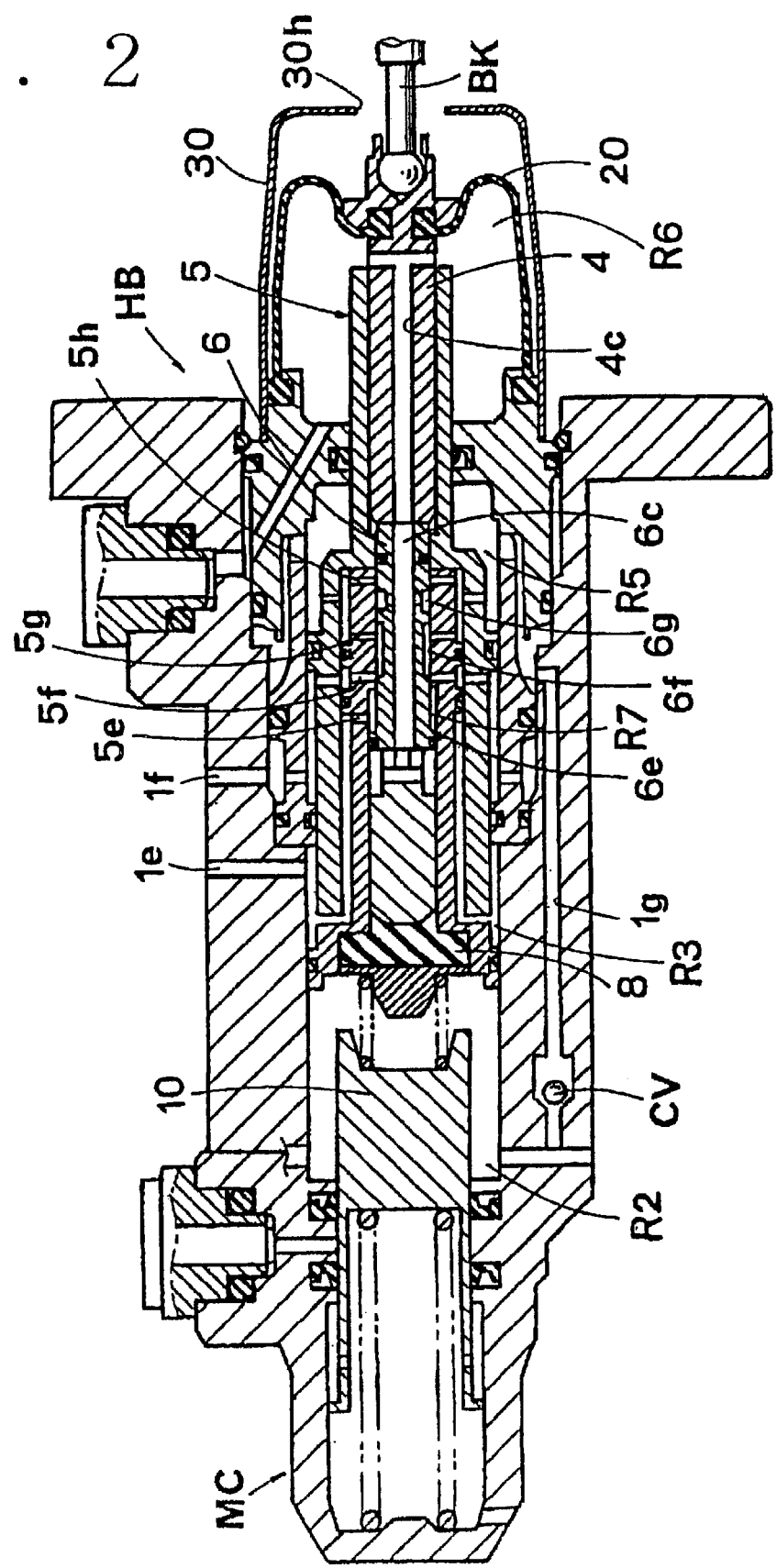
FIG. 2 is a cross-sectional view of the hydraulic brake apparatus shown in FIG. 1 when the hydraulic pressure assisting device is in an operated condition.

When the brake pedal operation is carried out, the spool 6 is moved forward by the forward movement of the input member 4 as shown in FIG. 2. Corresponding to the forward movement of the spool 6, the communication between the communicating hole 5h and the power chamber R5 is blocked by the spool 6, and so the communication between the communicating hole 6c and the power chamber R5 is interrupted. On the other hand, the annular groove 6f faces an opening portion of the respective communicating holes 5f, 5g, and so power hydraulic pressure is fed into the power chamber R5 via the inlet port 1f, the communicating hole 5f, the annular groove 6f, and the communicating hole 5g. The inlet port 1e communicates with the hydraulic pressure introducing chamber R7 via the annular chamber R3 and the communicating hole 5e. The solenoid valve V1 is in the closed position shown in FIG. 1 while the solenoid valve V2 is in the open position shown in FIG. 1. Because the inlet port 1e communicates with the reservoir RS via the solenoid valve V2, the spool 6 is activated in response to the forward movement of the input member 4, i.e. in response to the brake pedal operation. When the pressure differential between the power chamber R5 and the second pressure chamber R2 becomes equal to or larger than the predetermine value, the check valve CV is operated for being closed. The fluid passage 1g is thus blocked by virtue of the check valve 30 being at the closed position, wherein the second pressure chamber R2 becomes a hydraulically sealed space with the brake fluid fully filled therein.

As mentioned previously, while the hydraulic pressure booster HB is in the operated condition after the second pressure chamber R2 becomes the hydraulically sealed space, the pushing pressure applied to the front edge surface of the power piston 5 by the hydraulic pressure in the second pressure chamber R2 is balanced relative to the brake pedal operating force and the pushing force applied to the rear edge surface of the power piston 5. Because the effective cross-sectional area of the power piston 5 is larger than that of the master piston 10, the master piston 10 is moved forward corresponding to the forward movement of the power piston 5. Therefore, as shown in FIG. 2, the clearance between the master piston 10 and the power piston 5 is enlarged. The master piston 10 is hydraulically connected to the power piston 5 and can be moved as a unit. As described above, when the hydraulic pressure booster HB is in the operated condition, the power piston 5 is hydraulically connected to the master piston 10 via the brake fluid filled in the second pressure chamber R2. The power piston 5 and the master piston 10 are moved in the forward direction as a unit by the clearance defined between the power piston 5 and the master piston 10. Therefore, the forward movement of the power piston 5 and the master piston 10 as a unit can reduce the stroke of the brake pedal.

In the above condition, when the hydraulic pressure booster HB is in the operated condition, the rubber boot 20 is deformed and the volume of the drain chamber R6 is decreased as shown in FIG. 2. With the disclosed structure of the rubber boot 20, the axial length of the housing can be shortened by forming a drain passage with the rubber boot 20 and the cover 30, if necessary. Thus the axial length of the hydraulic pressure booster HB can be decreased. Because the drain passage is formed by the rubber boot 20, the cost associated with the hydraulic pressure booster HB is reduced and is not as great as the cost associated with known hydraulic pressure boosters. Further, relative slidable movement between the sealing member and the member to be sealed is not caused. Consequently, a relatively high sealing performance can be maintained.

Should the hydraulic pressure booster HB fail, as shown in FIG. 1, the power hydraulic pressure is not supplied to the annular chamber R4 and the power chamber R5. The annular chamber R3 communicates with the reservoir RS via the inlet port 1e. The second pressure chamber R2 communicates with the reservoir RS via the fluid passage 1g and the power chamber R5. Therefore, the second pressure chamber R2, the annular chambers R3, R4, and the power chamber R5 are maintained at atmospheric pressure. Accordingly, during forward movement of the input rod BK in response to the brake pedal operation, the plunger 7 is pushed forward via the input member 4 and the spool 6, and comes in contact with the reaction disc 8. The master piston 10 is pushed forward via the reaction disc 8, the pressure receiving member 9, and the return spring 12. Therefore, the power piston 5 is integrally moved forward with the master piston 10. In this case, the outputted hydraulic brake pressure from the master piston 10 is determined not by the effective cross-sectional area of the power piston 5, but by the effective cross-sectional area of the master piston 10. Therefore, should the hydraulic pressure booster HB fail, the pressure increase gradient becomes larger than the pressure increase gradient compared to the situation when the effective cross-sectional area of the power piston 5 is equal to that of the master piston 10.

According to the first embodiment of the present invention, an active brake operation or automatic brake operation is also performed. When the brake pedal is under the non-operated condition and the automatic brake operation is performed, the auxiliary hydraulic pressure source AS is activated with the solenoid valve V1 (shown in FIG. 1) being in the open position and the solenoid valve V2 (shown in FIG. 1) being in the closed position. Immediately after initiation of the automatic brake operation is performed, each component for the hydraulic brake apparatus is positioned as shown in FIG. 1. That is, because the spool 6 and the plunger 7 are positioned in the same manner as shown in FIG. 1, the communication between the communicating hole 5f and the power chamber R5 is blocked by the spool 6. The power hydraulic pressure outputted from the auxiliary hydraulic pressure source AS is supplied to the hydraulic pressure introducing chamber R7 through the inlet port 1e and the communicating hole 5e, wherein the spool 6 is moved in the forward direction and is positioned as shown in FIG. 2. The power chamber R5 communicates with the auxiliary hydraulic pressure source AS via the communicating hole 5g, the annular groove 6f, the communicating hole 5f, and the inlet port 1f, wherein the power piston 5 is moved forward. Corresponding to the forward movement of the power piston 5, the master piston 10 is moved in the forward direction, wherein hydraulic brake pressure is supplied to the wheel brake cylinder mounted on the respective wheels.

Under the above condition, the fluid passage 1g is blocked by the check valve CV being in the closed position (as shown in FIG. 2) corresponding to the pressure differential between the power chamber R5 and the second pressure chamber R2, wherein the second pressure chamber R2 becomes the sealed space filled with brake fluid. Therefore, the master piston 10 is moved in the forward direction in accordance with the pushing force applied to the effective cross-sectional area of the power piston 5 in response to the brake fluid introduced into the power chamber R5. As described above, when the brake pedal is in the non-operated condition and when the auxiliary hydraulic pressure source AS is actuated, the solenoid valves V1, V2 are controlled as needed so that the desired hydraulic brake pressure is outputted. In this case, the hydraulic brake pressure in the second pressure chamber R2 is applied to the pressure receiving member 9 and the reaction disc 8. A forward area of the input member 4 is hydraulically connected to the reservoir RS via the drain chamber R6 and the drain port 3d, wherein reaction force of the pushing force applied to the pressure receiving member 9 and the reaction disc 8 is not applied to the input member 4. The reaction force is opposed by the power hydraulic pressure outputted from the auxiliary hydraulic pressure source AS to the power piston 5. Further, the hydraulic pressure chamber R7 with the power hydraulic pressure outputted from the auxiliary hydraulic pressure AS is defined between the stepped portion 6e of the spool 6 and the power piston 5 and is separated from the hydraulic chamber defined in the forward direction of the input member 4. Therefore, the power hydraulic pressure outputted from the auxiliary hydraulic pressure source AS fed into the hydraulic pressure introducing chamber R7 is not transmitted as a reaction force to the input member 4.

Figure 3:
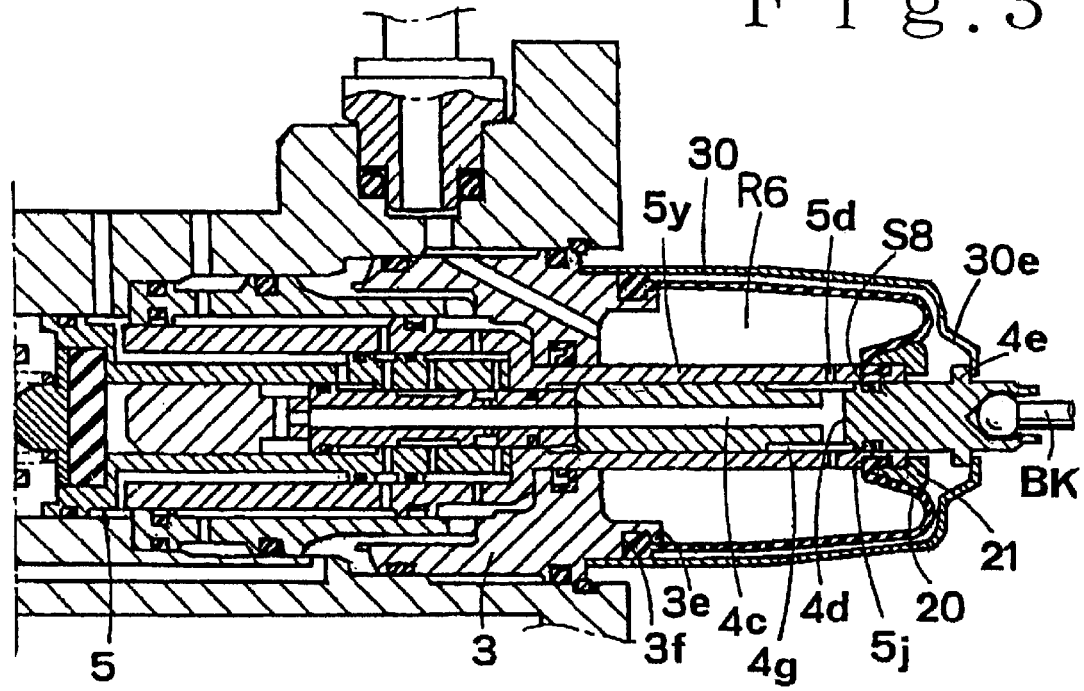
FIG. 3 is a cross-sectional view of the hydraulic pressure assisting device according to a second embodiment of the present invention.

FIG. 3 shows a hydraulic pressure booster HB according to a second embodiment of the present invention. According to the first embodiment of the present invention shown in FIG. 1, the one opening end portion of the rubber boot 20 is received by the annular groove 4f of the input member 4. According to the second embodiment shown in FIG. 3, the one opening end portion of the rubber boot 20 is connected to the piston member 5y of the power piston 5. That is, an annular groove 5j is defined at the outer surface of the rear end portion of the piston member 5y. The one opening end portion of the rubber boot 20 is received by the annular groove 5j. Further, an annular member 21 is disposed for covering the receiving portion. The other opening end portion of the rubber boot 20 is received by the annular groove 3f of the cylinder 3 in the same manner as in the first embodiment described above. The drain chamber R6 is thus defined in the rubber boot 20.

Because the one opening end portion of the rubber boot 20 is connected to the piston member 5y, the rear end portion of the input member 4 is structurally different from that shown in FIG. 1. Further, a communicating hole 5d is defined in the piston member 5y and is connected to the drain chamber R6. The input member 4 is accommodated in a fluid-tight and slidable manner in the hollow portion of the piston member 5y via a sealing member S8. The input rod BK is connected to the rearward portion of the input member 4. As shown in FIG. 3, the annular projecting portion 4e is formed at the rearward end portion of the input member 4 that extends rearwardly from the piston member 5y. The projecting portion 4e engages a projecting bottom portion 30e of the cover 30. An annular groove 4g is defined in the outer surface of the input member 4 and communicates with the communicating hole 4d. The communicating hole 4d communicates with the drain chamber R6 via the annular groove 4g and the communicating hole 5d.

According to the above-described second embodiment of the present invention, the drain chamber R6 is defined in the rubber boot 20. Therefore, the hydraulic pressure booster HB is entirely blocked from the outside. The structure of the other components in the hydraulic pressure booster HB is otherwise the same as that according to the first embodiment shown in FIG. 1 and described above and so a detailed description of such features will not be repeated here.

Figure 4:
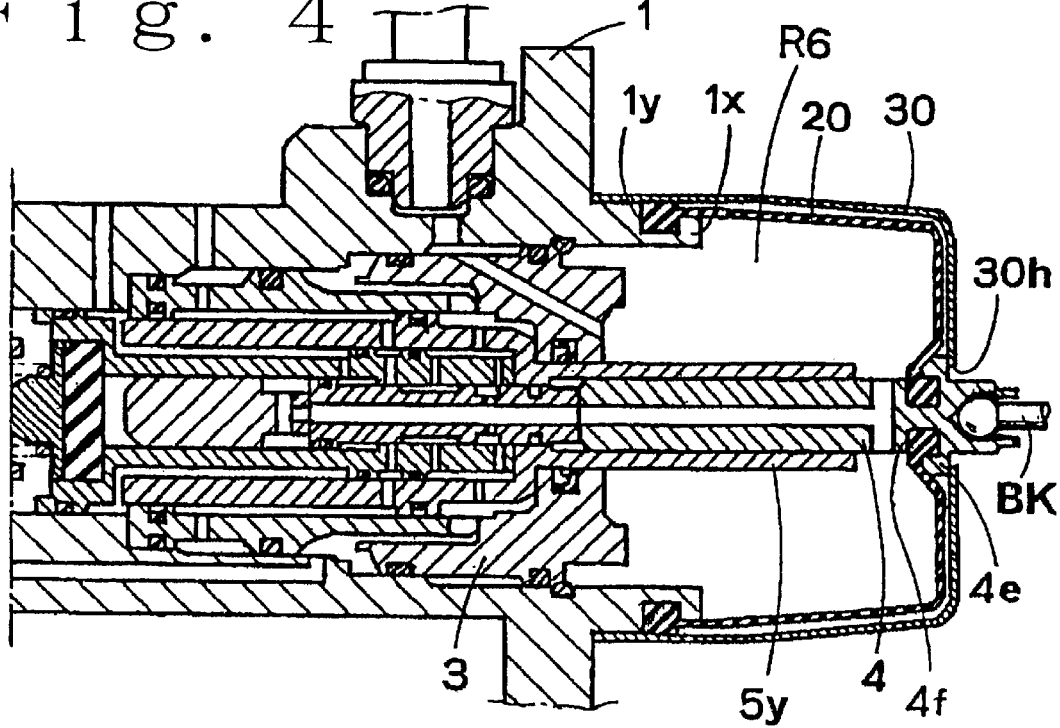
FIG. 4 is a cross-sectional view of a hydraulic pressure assisting device according to a third embodiment of the present invention.

FIG. 4 illustrates the hydraulic pressure booster HB according to a third embodiment of the present invention. As described above in connection with the first embodiment of the present invention, the other opening end portion of the rubber boot 20 is connected to the cylinder 3. According to the third embodiment, the other opening end portion of the rubber boot 20 is connected to the cylinder 1 forming the housing with the cylinder 3. That is, a cylindrical extending portion 1x is formed at the rearward outer periphery of the cylinder 1. An annular groove 1y is defined in the rearward outer periphery of the cylinder 1, and the other opening end portion of the rubber boot 20 is received in the annular groove 1y, with the cover 30 being disposed to cover the receiving portion. The one opening end portion of the rubber boot 20 is received by the annular groove 4f of the input member 4 in the same manner as in the first embodiment, wherein the drain chamber R6 is defined in the rubber boot 20.

According to the various embodiments of the present invention, the hydraulic pressure booster HB may be called a regulator as well. Therefore, the embodiments of the present invention are not necessarily limited to the hydraulic pressure booster HB or the hydraulic pressure assisting device, and are applicable to a regulator. The spool valve described above is configured as a spool 6 and serves as a pressure modulating device according to the described and illustrated embodiments of the present invention. However, as an alternative, a so-called poppet valve can also be employed as the pressure modulating device.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic pressure assisting device for a hydraulic brake apparatus of a vehicle, comprising:
   a power piston slidably accommodated in a housing and forming a power chamber in the housing;
   an input member movable relative to the power piston in response to operation of a brake operating member;
   an auxiliary hydraulic pressure source for increasing a hydraulic pressure of brake fluid in a reservoir to a predetermined pressure level and for outputting power hydraulic pressure;
   a pressure modulating device connected to the auxiliary hydraulic pressure source and the reservoir for modulating the power hydraulic pressure outputted from the auxiliary hydraulic pressure source to a predetermined pressure level corresponding to movement of the input member relative to the power piston and for supplying the modulated power hydraulic pressure to the power chamber; and
   a cylindrical elastic member having two opening end portions, one opening end portion being connected to the input member and the other opening end portion being connected to the housing, with a space defined in the cylindrical elastic member communicates with the pressure modulating device and the reservoir.

2. The hydraulic pressure assisting device according to claim 1, further comprising a solid covering member covering the cylindrical elastic member, an inner surface of the solid covering member being approximately in contact with an outer surface of the cylindrical elastic member when the brake operating member is in a non-operated condition.

3. The hydraulic pressure assisting device according to claim 1, wherein the pressure modulating device is connected to the reservoir via the space in the cylindrical elastic member and a hydraulic communicating passage defined in the housing.

4. The hydraulic pressure assisting device according to claim 1, wherein the housing includes a first cylinder, a second cylinder and a third cylinder.

5. The hydraulic pressure assisting device according to claim 4, wherein the first cylinder includes a stepped cylinder bore, the second and third cylinders being disposed in the stepped cylinder bore.

6. The hydraulic pressure assisting device according to claim 5, wherein the other opening end portion of the cylindrical elastic member is connected to the first cylinder.

7. The hydraulic pressure assisting device according to claim 5, wherein the other opening end portion of the cylindrical elastic member is connected to the third cylinder.

8. The hydraulic pressure assisting device according to claim 1, wherein the input member is provided with an axially extending communicating hole and a radially extending communicating hole, the radially extending communicating hole opening into the space defined in the cylindrical elastic member.

9. The hydraulic pressure assisting device according to claim 1, wherein the pressure modulating device is a spool.

10. A hydraulic pressure assisting device for a hydraulic brake apparatus of a vehicle, comprising:

a power piston slidably accommodated in a housing and forming a power chamber in the housing;

an input member movable relative to the power piston in response to operation of a brake operating member;

an auxiliary hydraulic pressure source for increasing hydraulic pressure of brake fluid in a reservoir to a predetermined pressure level and for outputting power hydraulic pressure;

a pressure modulating device connected to the auxiliary hydraulic pressure source and the reservoir for modulating the power hydraulic pressure outputted from the auxiliary hydraulic pressure source to a predetermined pressure level corresponding to movement of the input member relative to the power piston and for supplying the modulated power hydraulic pressure to the power chamber; and a cylindrical elastic member having two opening end portions, one opening end portion of being connected to the power piston and the other opening end portion being connected to the housing, with a space defined in the cylindrical elastic member communicating with the pressure modulating device and the reservoir.

11. The hydraulic pressure assisting device according to claim 10, further comprising a solid covering member covering the cylindrical elastic member, an inner surface of the solid covering member being approximately in contact with an outer surface of the cylindrical elastic member when the brake operating member is in a non-operated condition.

12. The hydraulic pressure assisting device according to claim 10, wherein the pressure modulating device is connected to the reservoir via the space in the cylindrical elastic member and a hydraulic communicating passage defined in the housing.

13. The hydraulic pressure assisting device according to claim 10, wherein the housing includes a first cylinder, a second cylinder and a third cylinder.

14. The hydraulic pressure assisting device according to claim 13, wherein the first cylinder includes a stepped cylinder bore, the second and third cylinders being disposed in the stepped cylinder bore.

15. The hydraulic pressure assisting device according to claim 14, wherein the other opening end portion of the cylindrical elastic member is connected to the third cylinder.

16. The hydraulic pressure assisting device according to claim 10, wherein the input member is provided with a communicating hole and the power piston is provided with a communicating hole that communicates the communicating hole in the input member with the space defined in the cylindrical elastic member.

17. The hydraulic pressure assisting device according to claim 16, wherein the communicating hole in the input member is a radially extending communication hole, the radially extending communication hole in the input member being communicated with an axially extending communicating hole in the input member.

18. The hydraulic pressure assisting device according to claim 10, wherein the pressure modulating device is a spool.

* * * * *